(12) United States Patent
Gahr et al.

(10) Patent No.: US 7,479,249 B2
(45) Date of Patent: Jan. 20, 2009

(54) METHOD FOR THE PRODUCTION OF CERAMICS

(75) Inventors: Michaela Gahr, Elchingen (DE); Walter Krenkel, Bayreuth (DE); Jens Schmidt, Fellbach (DE); Andreas Hofenauer, Eichenau (DE); Olaf Treusch, Munich (DE); Fritz Troeger, Haimhausen (DE); Gerd Wegener, Graefelfing (DE); Joerg Fromm, Herrsching (DE)

(73) Assignee: Deutsches Zentrun fuer luft-und Raumfahrt e.V., Bonn (DE)

( * ) Notice: Subject to any disclaimer, the term of this patent is extended or adjusted under 35 U.S.C. 154(b) by 486 days.

(21) Appl. No.: 10/878,664

(22) Filed: Jun. 28, 2004

(65) Prior Publication Data

US 2005/0037914 A1 Feb. 17, 2005

(30) Foreign Application Priority Data

Jun. 30, 2003 (DE) ................. 103 29 822

(51) Int. Cl.
*C04B 35/573* (2006.01)
(52) U.S. Cl. ........................ 264/662; 264/88
(58) Field of Classification Search ............. 264/82, 264/332; 501/88
See application file for complete search history.

(56) References Cited

U.S. PATENT DOCUMENTS 4,564,496 A 1/1986 Gupta et al.

FOREIGN PATENT DOCUMENTS

| DE | 31 08 266 | 9/1982 |
|---|---|---|
| DE | 199 47 731 | 4/2001 |
| DE | 101 61 108 | 6/2003 |
| EP | 1 219 578 | 7/2002 |
| GB | 755046 | 8/1956 |
| GB | 901176 | 7/1962 |
| JP | 61086411 | 5/1986 |

OTHER PUBLICATIONS

Royse et al, Influence of substrate wood-chip particle size on shiitake yield, abstract only, Feb. 2001 2 pages.*
Hoffmann, C., et al., "Biomorphic SiSiC Ceramic Composites from Preprocessed Biological Fibers,"International Conference on High Temperature Ceramic Composites, Oct. 1, 2001, pp. 407-413.
Ohzawa, Yoshimi, et al., "Relation between porosity and pore size or pressure drop of fibrous SiC Filter prepared from carbonized cellulose-powder preforms," Materials Science and Engineering A255, 1998, pp. 33-38.

(Continued)

*Primary Examiner*—Carlos Lopez
(74) *Attorney, Agent, or Firm*—Lipsitz & McAllister, LLC

(57) ABSTRACT

In order to improve a method for the production of structural ceramics and/or functional ceramics consisting of silicon carbide ceramics, with which a porous precursor body is produced from a cellulose-containing material, the porous precursor body is converted into an open-pored carbon body by means of pyrolysis and the open-pored carbon body is converted into silicon-containing carbide ceramics, in particular, silicon carbide ceramics as a result of infiltration of silicon-containing materials, in such a manner that the structural ceramics and/or functional ceramics as well as the components produced therefrom can be produced with properties which are as reproducible as possible it is suggested that at least cellulose-containing powder be used as starting ingredient for the production of the precursor body.

76 Claims, 8 Drawing Sheets

OTHER PUBLICATIONS

Qian, Junmin, et al., "Preparation of macroporous SiC from Si and wood powder using infiltration-reaction process," Materials Science and Engineering A358, Oct. 2003, pp. 304-309.

Hofenauer, Andreas, et al., "Dense Reaction Infiltrated Silicon/Silicon Carbide Ceramics Derived from Wood based Composites," Advanced Engineering Materials, Nov. 2003, pp. 794-799.

* cited by examiner

METHOD FOR THE PRODUCTION OF CERAMICS

The present disclosure relates to the subject matter disclosed in German application No. 103 29 822.3 of Jun. 30, 2003, which is incorporated herein by reference in its entirety and for all purposes.

BACKGROUND OF THE INVENTION

The invention relates to a method for the production of structural ceramics and/or functional ceramics consisting of silicon-containing carbide ceramics, in particular, silicon carbide ceramics.

In addition, the invention relates to a component consisting of structural ceramics and/or functional ceramics consisting of silicon-containing carbide ceramics, in particular, silicon carbide ceramics.

DE 199 47 731 discloses a method for the production of structural ceramics and/or functional ceramics consisting of silicon carbide ceramics, with which a porous precursor body is produced from a cellulose-containing material, the porous precursor body is converted into an open-celled or open-pored carbon body by means of pyrolysis and the open-pored carbon body is converted into silicon-containing carbide ceramics, in particular, silicon carbide ceramics as a result of infiltration of silicon-containing materials, in particular, silicon or silicon alloys.

In addition, DE 199 47 731 A1 also discloses a component of this type.

In the case of the known method for the production of such components consisting of structural ceramics and/or functional ceramics, wood ingredients in the form of coarse chips or veneered wood layers of different thicknesses are used. A porous precursor body does result due to pressing but distinct density gradients are present in this body on account of the pressing techniques.

In addition, an anisotropy is to be noted due to the fact that the precursor body is compacted to a greater extent in the edge areas than in inner areas.

The anisotropy is extremely noticeable, in particular, in the case of the layer construction of individual wood veneer layers.

Altogether, the precursor body has a relatively inhomogeneous construction in all spatial directions which, again, results in a uniform discharge of the gases from the precursor body being prevented during the pyrolysis.

In addition, a considerable deformation cannot be avoided during the pyrolysis.

Altogether, the ceramic structure obtained has a coarse texture and, apart from silicon carbide, has locally occurring areas with high enrichments of residual silicon and residual carbon. The cause of this is likewise to be seen in the use of the coarse wood chips and the veneer layers and the intergranular cavity formation connected therewith.

Altogether, the structural ceramics and/or functional ceramics produced by means of the known method as well as the components obtainable therefrom can be manufactured with properties which can be reproduced only to a small degree.

The object underlying the invention is, therefore, to improve a method of the type described at the outset in such a manner that the structural ceramics and/or functional ceramics as well as the components produced therefrom can be produced with properties which are as reproducible as possible.

SUMMARY OF THE INVENTION

This object is accomplished in accordance with the invention, in a method of the type described at the outset, in that at least cellulose-containing powder is used as starting ingredient for the production of the precursor body.

As a result of the use of cellulose-containing powder and binding agent for the production of the precursor body, the precursor body may be produced with an essentially homogeneous density and porosity and, as a result, the structural ceramics and/or functional ceramics produced therefrom can be produced with reproducible properties.

In this respect, it is favorable when the starting ingredients have a grain size of less than 300 μm, even better less than 100 μm, even better less than 50 μm.

It has proven to be favorable, in particular, with respect to the cellulose-containing powder when this has a grain size of less than 50 μm, even better less than 30 μm.

In this respect, it is particularly advantageous when the cellulose-containing powder has particles free from any capillary cell structure. A capillary cell structure is to be understood only as structures with many cells which are completely present. This means that the cellulose-containing powder no longer has the customary capillary cell structure of wood chips but rather has small grain sizes in such a manner that the capillary cell structure is no longer present with respect to its effects on the inventive method, in any case has no effects whatsoever on the properties of the entirety of the particles in the precursor body. This means that the particles can also comprise only a few cells, wherein the cavities remaining between these few cells have no effects on the porosity of the precursor body.

In contrast to the solution known from the state of the art, the effects of the capillary cell structure of the wood on the siliconization are deliberately dispensed with in this embodiment of the inventive solution and, in particular, a microstructure is created in the precursor body, the properties and porosity of which are caused primarily by the mixing ratio and the grain size of the cellulose-containing powder and of the binding agent which is present where applicable but not by properties and structure of the particles themselves. As a result, it is possible to define the properties of the precursor body, in particular, its homogeneity exactly and, therefore, to also be able to reproduce the properties of the structural ceramics or functional ceramics.

The cellulose-containing powder can be produced in the most varied of ways. For example, it is conceivable in the simplest case to use sufficiently fine wood powder as cellulose-containing powder.

Another alternative solution provides for the cellulose-containing powder to be free from cellular structures, i.e., to no longer comprise any cells which are completely present.

In the case of wood particles, only fragments of the cell walls are, therefore, still present.

Alternatively to wood particles, a cellulose-containing powder of this type comprises, for example, cellulose powder.

In principle, the precursor body can be produced merely by pressing the cellulose-containing powder.

It is particularly favorable when binding agent is added as starting ingredient.

The binding agent used as starting ingredient could, for example, be a liquid binding agent, into which the cellulose-containing powder is mixed. In order to obtain an advantageous and complete intermixing with mixing times which are as short as possible, it is, however, of advantage when dry binding agent is used as binding agent since this may be mixed with cellulose-containing powder much more advantageously.

It is particularly favorable when the dry binding agent is added to the cellulose-containing powder in powder form.

For example, it is provided for the powdery binding agent to have a grain size of less than 100 μm, even better less than 50 μm, even better less than 15 μm.

The binding agent can consist of various materials, in particular, various glues or resins.

A particularly favorable solution provides for the binding agent to comprise phenol resin.

Particularly good mixing results between the cellulose-containing powder and the binding agent are obtained when the grain size of the cellulose-containing powder and of the binding agent are approximately in the same order of magnitude, i.e., are within approximately the same power of ten.

In this respect, it is particularly favorable when the grain size of the cellulose-containing powder and of the binding agent differ from one another by at the most a factor of 3, even better do not differ in their size.

With respect to the starting ingredients in the inventive method, it is conceivable to use only cellulose-containing powder and binding agent.

It is, however, also conceivable to add at least one additive as starting ingredient.

With such an additive selected in a suitable manner, the properties of the structural ceramics and/or functional ceramics are even better to reproduce.

The additive may be added, in principle, in the most varied of forms.

With respect to the mixing, it has likewise proven to be particularly favorable when the additive is in powder form.

Furthermore, it is likewise advantageously provided for the additive to have a grain size which is in the order of magnitude of or less than the grain size of the cellulose-containing powder.

It is even better when the grain size of the at least one additive and of the cellulose-containing powder differ at the most by a factor of 5, even better a factor of 3.

With respect to the type of additive which can be added, the most varied of solutions are conceivable.

For example, one advantageous solution provides for the additive to be a reactive additive, i.e., an additive which itself reacts during the course of the method for the production of the structural ceramics and/or functional ceramics.

Such a reactive additive is preferably carbon powder which can be added, for example, in the form of carbon black and/or graphite and/or coke.

Alternatively to adding a reactive additive, it is also possible to add a non-reactive additive.

For example, such non-reactive additives are carbides and/or borides and/or nitrides and/or suicides and/or oxides.

In order to be able to obtain the properties of the structural ceramics and/or functional ceramics so as to be as reproducible as possible, it is preferably provided for the starting ingredients to already be mixed in a dry state.

The starting ingredients are preferably homogenized as a result of mixing.

In order to produce a body with a defined shape from the starting ingredients, it is preferably provided for the starting ingredients to be fed into a mold.

This method may be realized in a particularly favorable manner when the starting ingredients are fed into the mold in a dry state so that the state of the starting ingredients homogenized as a result of the mixing can be retained.

In order to obtain as homogeneous a structure as possible of the precursor body, it is preferably provided for the starting ingredients to be pressed to form a molded body.

In this respect, a preliminary compression of the starting ingredients to form the molded body is preferably provided at compacting pressures of up to 15 MPa.

In this respect, the preliminary pressing of the starting ingredients to form the molded body is preferably carried out without any hardening of the binding agent. As a result, an essentially homogeneous compression of the molded body is achieved, in particular, essentially without any formation of density gradients.

This preliminary pressing essentially takes place without any heating.

In this respect, a molded body can preferably be produced with a density which is in the range of approximately 0.4 g/cm$^3$ to approximately 1.5 g/cm$^3$. It is even better when the molded body has a density which is in the range of approximately 0.65 g/cm$^3$ to approximately 1.0 g/cm$^3$.

It is preferably provided for the production of the molded body for the molded body to be heated to a temperature, at which the hardening of the binding agent takes place.

Expediently, the heating up of the molded body takes place in such a manner that the binding agent is hardened essentially completely.

For example, the hardening of the binding agent takes place at temperatures at 220° C. and, for example, a pressure of at the most 15 MPa.

In order to avoid any deformation of the molded body, it is preferably provided for the heating up of the molded body for the hardening of the binding agent to take place in a press.

With respect to the porosity of the precursor body, it is preferably provided for the open-pored precursor body to have an average porosity which is in the range of between approximately 10% by volume and approximately 70% by volume. It is even better when the open-pored precursor body has an average porosity which is in the range of between approximately 20% by volume and approximately 60% by volume.

A molded body produced in this manner contains mostly water molecules which result during the hardening of the binding agent.

In addition, a molded body produced in this manner has the tendency to incorporate water from the surrounding air.

For this reason, it is provided in one advantageous solution of the inventive method for the precursor body to be pyrolysed essentially without any storage time following the hardening of the binding agent.

Another possibility is for the precursor body to be stored in a manner inert to moisture following the hardening of the binding agent.

Such storage of the precursor body inert to moisture provides, for example, for the storage of the precursor body in a manner closed so as to be air-tight following the hardening of the binding agent.

In this respect, it is particularly favorable when the air-tight storage is brought about by sealing the precursor body in a film.

Another possibility is for the precursor body to be stored in inert gas following the hardening of the binding agent.

In order to remove the moisture from the precursor body, an additional, advantageous solution of the inventive method provides for the open-pored precursor body to be dried prior to the pyrolysis.

Such drying could be carried out in a one-stage drying process.

In order for drying to be carried out as carefully as possible, one embodiment of the inventive method provides for the drying to be carried out in several temperature stages.

In this respect, it is preferably provided for the drying temperature in a first drying stage to be between room temperature and at the most approximately 35° C.

A further, advantageous solution provides for the drying temperature in a second drying stage to be in the range of between approximately 35° C. and at the most approximately 70° C.

A further, advantageous solution provides for the drying temperature in a third drying stage to be between approximately 70° C. and at the most approximately 110° C.

In order to be able to carry out the drying procedure as gradually as possible, it is expediently provided for the heating velocity during the drying to be at the most 10 degrees per minute.

Furthermore, it is preferably provided for the holding time in a drying stage to be at the most 20 hours.

The pyrolysis is carried out in an inert atmosphere or vacuum.

In this respect, the drying can be carried out prior to the pyrolysis as a separate method step. It is, however, also conceivable to initiate the pyrolysis in such a manner that, for example, drying is integrated into the first pyrolysis stage.

A particularly favorable solution provides for the pyrolysis of the precursor body to be carried out in a nitrogen atmosphere.

In this respect, one possibility provides for the pyrolysis to be carried out at a nitrogen atmosphere pressure of at least 1,000 mbar.

Another possibility provides for the pyrolysis of the precursor body to be carried out at a pressure of less than 1,000 mbar.

Furthermore, the pyrolysis may be carried out in different ways.

One advantageous embodiment provides for the pyrolysis of the precursor body to be carried out in one stage.

In such a case, it is provided for a heating up from room temperature to at the most 1700° C. to be brought about during the one-stage pyrolysis.

Furthermore, it is preferably provided for the one-stage pyrolysis to be carried out during a total time period of not more than 120 hours.

A further, advantageous solution, in particular, with respect to a complete pyrolysis provides for the pyrolysis of the precursor body to be carried out in at least two stages.

In this respect, it is, for example, provided for a heating up from room temperature to at the most 900° C. to be brought about in a first pyrolysis stage.

Furthermore, one favorable solution provides for a cooling to room temperature to be brought about following the first pyrolysis stage.

In this respect, the total time period of the pyrolysis in the first pyrolysis stage is preferably not more than 120 hours.

Furthermore, it is favorable for the completion of the pyrolysis when the pyrolysis provides in a second pyrolysis stage for a temperature treatment from room temperature up to at the most 1700° C.

In this respect, it is provided, in particular, in the second pyrolysis stage for the kiln chamber to be evacuated and the pressure to be in the range of between approximately 0.1 mbar and approximately 10 mbar.

After termination of the second pyrolysis stage it is preferably provided for a cooling to room temperature to take place.

It is particularly favorable for the temperature to increase slowly during the pyrolysis, i.e., for a time period of at least 10 hours until approximately 400° C. is reached in order to keep the formation of cracks as slight as possible.

With respect to the porosity of the open-pored carbon body resulting during the pyrolysis, values of between approximately 30% by volume up to approximately 80% by volume are preferably reached. It is even better when the open-pored carbon body has a porosity which is in the range of between approximately 35% by volume and approximately 70% by volume.

The inventive structural ceramics and/or functional ceramics may be produced particularly advantageously when the carbon body has an open, in particular, isotropic porosity throughout.

Furthermore, it is favorable for the siliconization when the carbon body has essentially directionally independent, in particular, infiltration properties for silicon-containing materials, in particular, silicon and silicon alloys.

In order to be able to avoid any machining of the carbon body as far as possible following its siliconization, it is preferably provided for the carbon body to be produced in a shape close to the end contours. This applies, in particular, when the structural ceramics and/or functional ceramics to be produced correspond to the component to be produced with the inventive method.

Alternatively thereto, it is provided for the carbon body to be produced as a portion of a shape close to the end contours, i.e., the desired component is then produced from several portions, which are already pyrolysed, in that the portions are connected to one another and, subsequently, the entire component is siliconized.

The siliconization could, in principle, be brought about in any optional manner, for example, also with steam.

It has, however, proven to be particularly suitable when the siliconization is carried out in the form of a liquid siliconization.

The temperature during such a liquid siliconization is preferably above 1400° C.

Furthermore, it is preferably provided for the pressure of the nitrogen during the siliconization to be in the range of between approximately 0.01 mbar and approximately 10 mbar.

While carrying out the siliconization it has proven to be advantageous when the maximum temperature during the siliconization is maintained for up to two hours.

Furthermore, it is advantageous, for example, in order to obtain structural ceramics and/or functional ceramics which are ceramicized as far as possible throughout when at least approximately 200% of silicon in relation to the mass of the carbon body is offered during the siliconization.

In this respect, a silicon granulate, the grain size of which is between approximately 0.1 mm and approximately 10 mm, is expediently used during the siliconization.

In this respect, it is particularly favorable when the siliconized carbon body is produced with a homogeneous, gradient-free, in particular, isotropic silicon carbide ceramic structure.

In addition, the object specified at the outset is also accomplished by a component consisting of structural ceramics and/or functional ceramics, comprising a carbon body, which is infiltrated with silicon-containing materials, in particular, silicon and silicon alloys and, as a result, is ceramicized essentially to form silicon-containing carbide, in particular, silicon carbide, with which the carbon body has an essentially homogeneous pore structure due to use of at least cellulose-containing powder as starting ingredient.

Apart from the advantages specified above, the advantage of this solution is also to be seen in the fact that the component itself has homogeneous and defined properties.

In this respect, it is particularly favorable when the open-pored carbon body has a porosity which is in the range of between approximately 30% by volume up to approximately 80% by volume.

It is even better when the open-pored carbon body has a porosity which is in the range of between approximately 35% by volume and approximately 70% by volume.

The inventive component is particularly expedient when the carbon body has an essentially continuous, open, isotropic porosity.

Furthermore, it is of particular advantage from the point of view of the hardness of the component when the carbon body is infiltrated by the silicon-containing materials essentially independent of direction, in particular, isotropically.

In order to produce the inventive component particularly easily, it is preferably provided for the carbon body to have a shape close to the end contours.

Alternatively, it is provided, when the component itself is intended to be produced from several parts, for the carbon body to have a portion of a shape close to the end contours.

In addition, it is advantageously provided for the siliconized carbon body to have a silicon-containing carbide ceramic structure, in particular, silicon carbide ceramic structure which is essentially homogeneous, free from gradients and, in particular, isotropic.

A particularly favorable form of a component provides for the silicon carbide ceramics to have a density of more than 2.9 g/cm$^3$. It is even better when the density is more than 3 g/cm$^3$.

The inventive solution relates, in addition, to a precursor body for the production of structural ceramics and/or functional ceramics consisting of silicon-containing carbide ceramics, in particular, silicon carbide ceramics by way of infiltration of silicon-containing materials, in particular, silicon or silicon alloys into a carbon body produced from such a precursor body by way of pyrolysis, wherein the precursor body has in accordance with the invention at least bonded cellulose-containing powder as starting ingredient.

In this respect, it is particularly favorable when the starting ingredients have a grain size of less than 300 µm, even better less than 100 µm and even better 50 µm.

In this respect, the cellulose-containing powder can be of the most varied origins. It is particularly favorable when the cellulose-containing powder has particles free from any capillary cell structure.

A particularly advantageous type of cellulose-containing powder provides for this to comprise wood powder.

Alternatively to wood powder, it is provided for the cellulose-containing powder to comprise particles free from any cellular structures.

A particularly favorable form of the particles free from any cellular structures is cellulose powder particles.

In principle, the precursor body could be produced merely by pressing the cellulose-containing powder. It is, however, particularly favorable when a binding agent is added as starting ingredient.

With respect to the binding agent, the most varied of solutions are conceivable. It is advantageously provided for this to comprise a phenol resin.

Since the inventive precursor body can be produced not only by way of cellulose-containing powder as starting ingredient, an additional, advantageous solution provides for at least one additive to be added to the cellulose-containing powder as starting ingredient for the production of the precursor body.

This additive is also preferably in powder form and has a grain size in a suitable size. It is particularly favorable when the additive has a grain size which is in the order of magnitude of or less than the grain size of the cellulose-containing powder. It is even more favorable when the grain size of the at least one additive and of the cellulose-containing powder differ at the most by a factor of 5, even better at the most a factor of 3.

The additive can be selected in the most varied of ways. One possibility provides for a reactive additive to be selected, another possibility a non-reactive additive.

In this respect, the open-pored precursor body preferably has an average porosity which is in the range of between approximately 10% by volume and approximately 70% by volume, even better between approximately 20% by volume and approximately 60% by volume.

Additional features and advantages of the invention are the subject mater of the following description as well as the drawings illustrating several embodiments.

Table 1 shows a tabulated illustration of development of porosity and density during the course of the first embodiment of the inventive method;

Table 2 shows a tabulated illustration of the development of porosity and density in the case of the second embodiment of the inventive method;

Table 3 shows a tabulated illustration of the development of porosity and density in the case of the third embodiment of the inventive method.

DETAILED DESCRIPTION OF THE INVENTION

Figure 1:
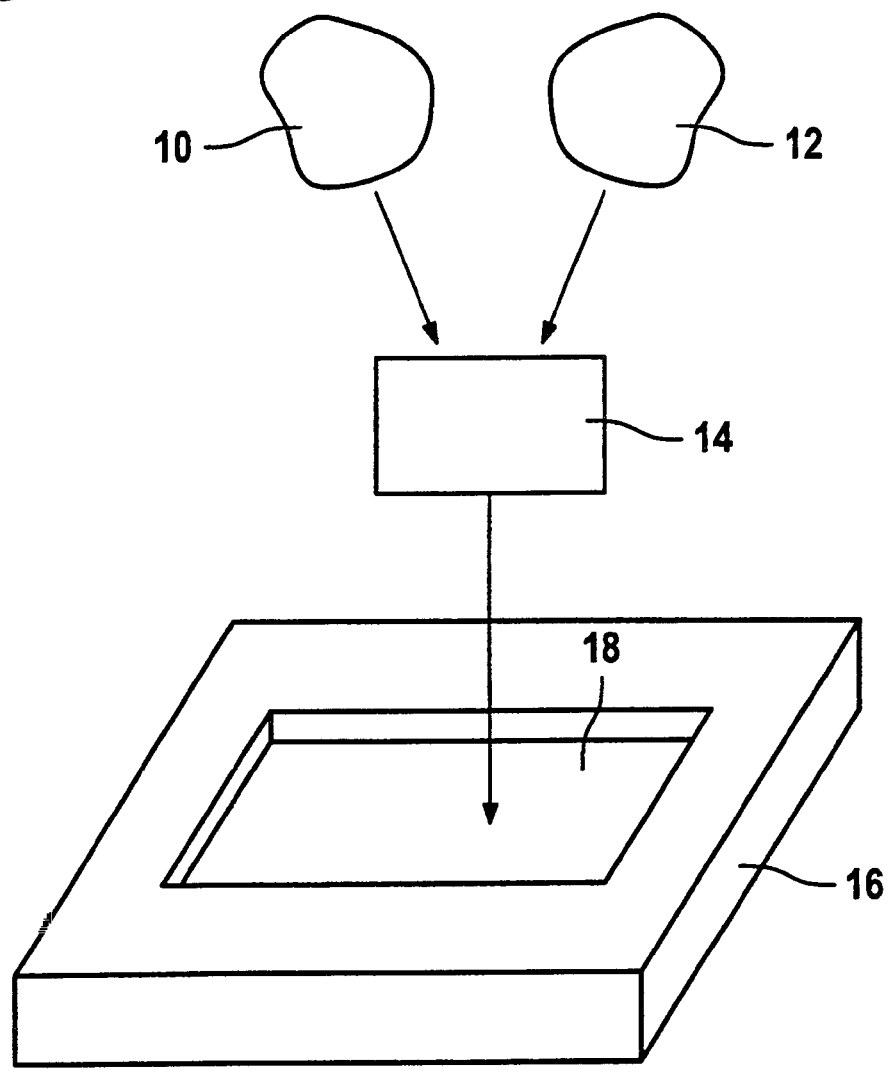
FIG. 1 shows a schematic illustration of first method steps in a first embodiment of an inventive method.

A first embodiment of an inventive method for the production of a plate consisting of structural ceramics and/or functional ceramics provides for wood flour 10, in this case beech flour, with a grain size of less than 50 μm and a binding agent 12, for example, phenol resin with a grain size of less than 15 μm to be mixed with one another in a dry state in a mixer 14 as starting ingredients, wherein the mass proportion of the wood flour is, for example, 77% and the mass proportion of the binding agent 23% (FIG. 1).

The wood flour mixed in a dry state with the binding agent 12 in the mixer 14 is then passed into a recess 18 in a mold 16, wherein the recess 18 has the basic shape of the plate consisting of structural ceramics and/or functional ceramics which is to be produced.

Figure 2:
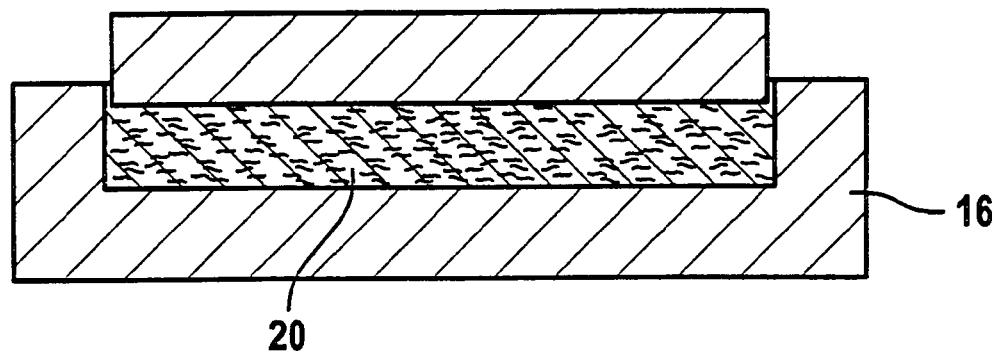
FIG. 2 shows a schematic illustration of a pressing of a molded body in the first embodiment of the inventive method.

As illustrated in FIG. 2, the dry mixture consisting of wood flour 10 and binding agent 12 is compressed in the mold 16 to form a molded body 20 at compacting pressures of up to first of all 15 MPa but in such a manner that the binding agent 12 is not yet hardened in the molded body 20.

Figure 3:
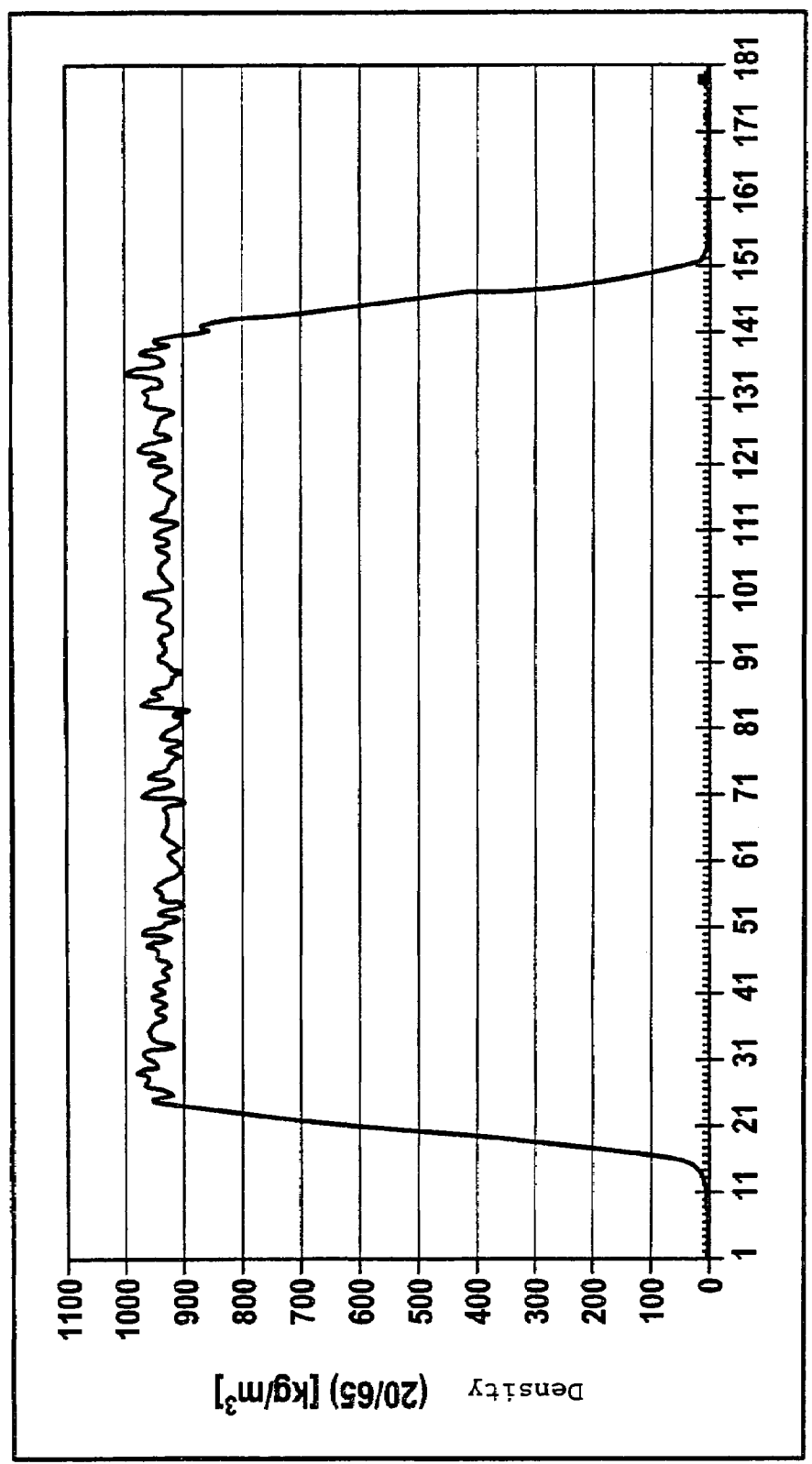
FIG. 3 shows an illustration of a density profile in the first embodiment of the inventive method.

The molded body has, as illustrated in FIG. 3, a density profile which shows that the structure of the molded body 20 is homogeneous and free from gradients.

This molded body 20 is heated in the mold 16 after pressing, whilst maintaining the compacting pressure at least partially, in order to harden the binding agent 12. The heating process provides for the molded body 20 to be heated to temperatures of up to 220° C. in order to cause the binding agent 12 to harden essentially completely and to combine homogeneously with the wood flour 10.

In this respect, a precursor body 22 results which is stable in its shape on account of the hardened binding agent 12.

Figure 4:
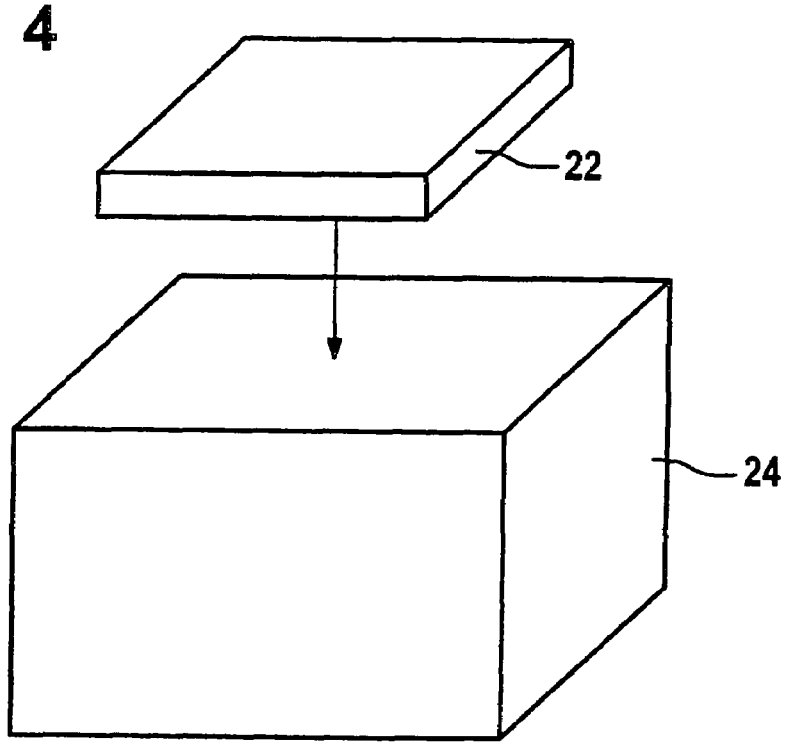
FIG. 4 shows a schematic illustration of a drying procedure in the first embodiment of the inventive method.

This precursor body 22 is subsequently dried, as illustrated in FIG. 4, in a drying cupboard in air, wherein a loss of mass of 0.1% occurs. The drying process in the drying cupboard 24 is carried out in several stages of drying in accordance with FIG. 5.

This means that the precursor body is heated first of all to a temperature of 35° C. and kept at this temperature for approximately 24 hours in a first drying stage. Subsequently, it is heated to approximately 70° C. and kept at this temperature in a second drying stage for a further 24 hours and, thereafter, it is heated to 110° C. and kept at this temperature during a third drying stage for approximately a further 24 hours. After this, it is cooled.

The drying of the precursor body 22 serves the purpose of removing residual water bound adsorptively at the surface of the wood flour particles as well as that resulting due to the polycondensation of the binding agent during hardening.

Figure 5:
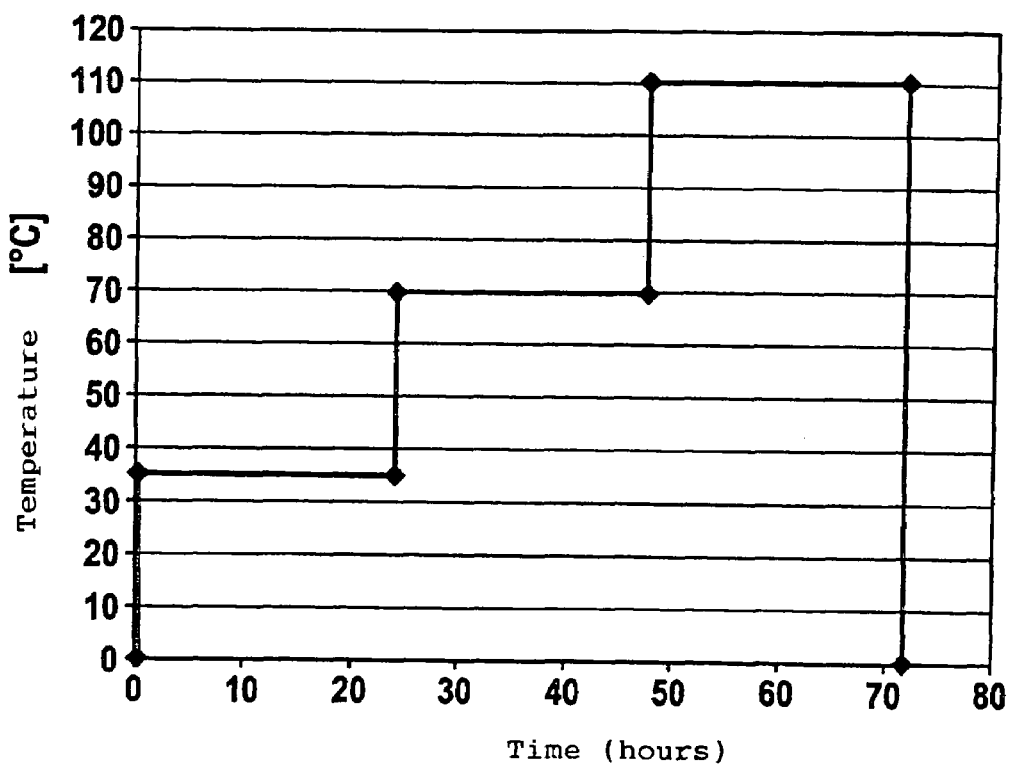
FIG. 5 shows a schematic illustration of a temperature control during a drying process in the first embodiment of the inventive method.

The drying process illustrated in FIG. 5 is subdivided into three drying stages in order to achieve as gentle a drying of the precursor body as possible, wherein any formation of cracks in the precursor body is intended to be avoided, in particular.

The precursor body has, as illustrated, for example, in Table 1, a porosity of approximately 38% by volume and a density of approximately 0.9 g/cm$^3$.

Figure 6:
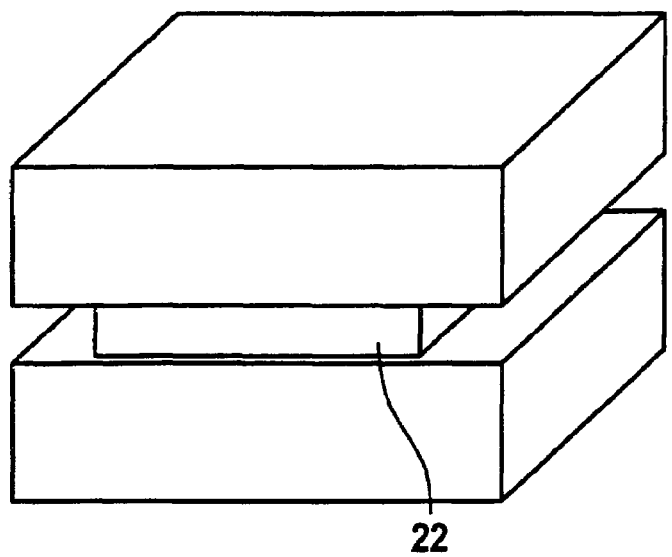
FIG. 6 shows a schematic illustration of a force acting on a precursor body in the first embodiment of the inventive method.
Figure 7:
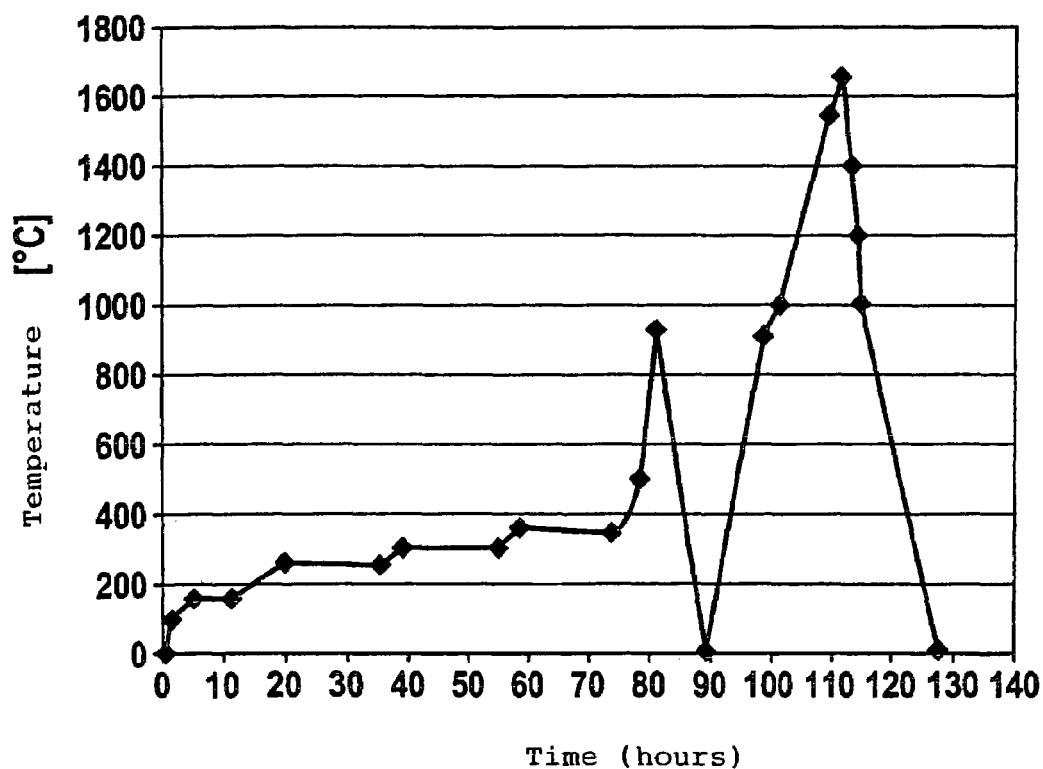
FIG. 7 shows a schematic illustration of a temperature control during the pyrolysis of the precursor body in accordance with the first embodiment of the inventive method.

This precursor body 22 will now, as illustrated in FIG. 6, be pyrolysed under a mechanical load of approximately 0.1 N/cm$^2$, namely in nitrogen as protective gas at pressures of approximately 1,050 mbar. The temperature control in the pyrolysis device is illustrated schematically in FIG. 7, wherein during the course of a first pyrolysis stage lasting approximately 90 hours a step-like increase in the temperature up to approximately 380° C. takes place first of all during the first 70 hours, for example a step-like increase in the temperature in altogether four steps. Subsequently, the temperature is increased in the first pyrolysis stage to approximately 900° C. The temperature of approximately 900° C. is reached after approximately 80 hours. Subsequently, to terminate the first pyrolysis stage a cooling to room temperature is brought about which is reached after approximately 90 hours.

Within the scope of a second pyrolysis stage, a quick heating up from room temperature to a temperature of approximately 1650° C. takes place which is reached after approximately 110 hours and, subsequently, a cooling to room temperature which is reached again after approximately 128 hours.

During the first pyrolysis stage lasting altogether 90 hours, a reduction in mass of 64% occurs and during the subsequent second pyrolysis stage at a reduced pressure of less than 2 mbar a further reduction in mass of an additional 6.4%.

As a result, the precursor body 22 has, following the pyrolysis, experienced altogether an approximate loss in mass of 66.3%.

The porosity and the density of the precursor body following the first pyrolysis stage and the second pyrolysis stage are likewise illustrated in Table 1. After the first pyrolysis stage, the porosity is approximately 52% by volume and the density approximately 0.87 g/cm$^3$ whereas after the second pyrolysis stage the porosity is approximately 56% by volume and the density approximately 0.85 g/cm$^3$.

The entire shrinkage in length during the pyrolysis was approximately 26% by length whereas the entire shrinkage in volume was approximately 64% by volume.

Figure 8:
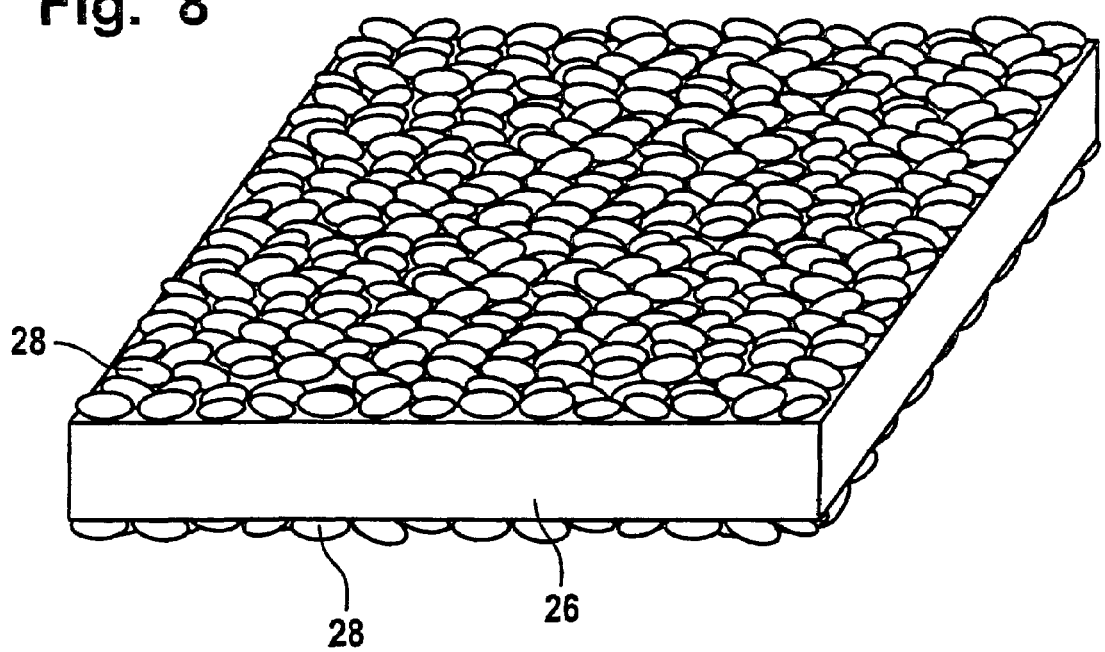
FIG. 8 shows a schematic illustration of an arrangement of the carbon body during the siliconization.

The carbon body 26 resulting from the precursor body 22 following the pyrolysis is, as illustrated in FIG. 8, siliconized for the production of the structural ceramics or functional ceramics, wherein the carbon body 26 is siliconized in a horizontal position with four times the amount of silicon 28 in relation to the mass of the carbon body. In this respect, approximately 50% of the silicon 28 is offered from above and 50% of the silicon 28 from below. The silicon has a grain size of 0.1 to approximately 10 mm.

Figure 9:
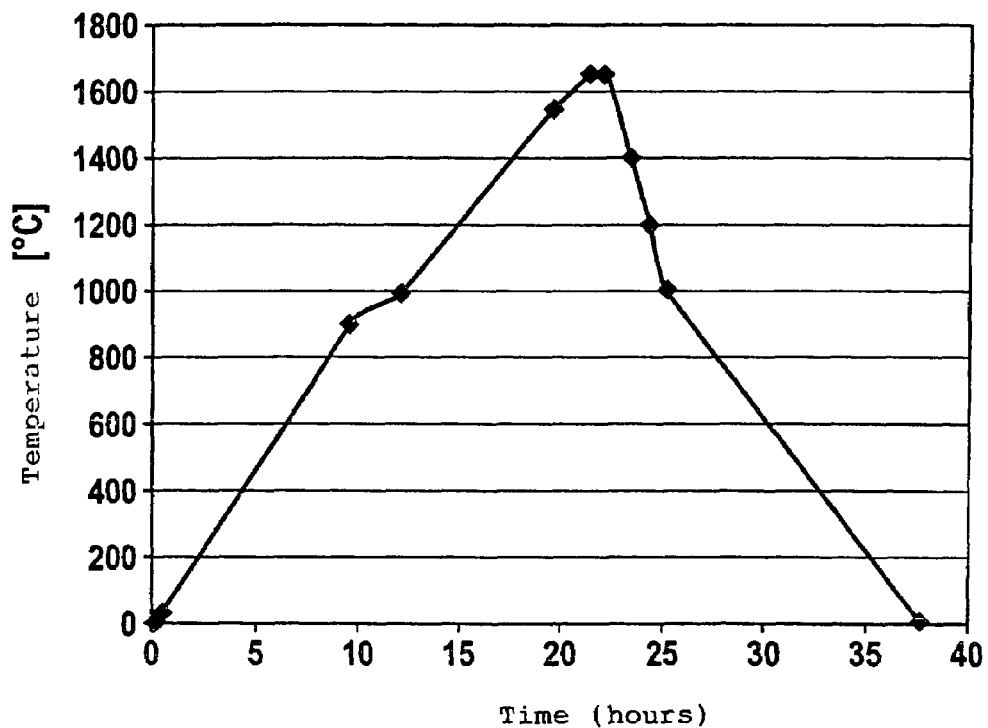
FIG. 9 shows a schematic illustration of a temperature control during the siliconization of the carbon body in the case of the method according to the first embodiment.

The silicon 28 is liquefied by way of heating in accordance with FIG. 9, penetrates the open pores of the carbon body 26 and leads therein to the formation of SiC ceramics which is dense and more or less pore-free, wherein a silicon mass absorption by the carbon body 26 of approximately 306% by mass takes place.

The temperature control during the siliconization of the carbon body 26 is illustrated in FIG. 9 in detail. In this respect, it is apparent that a linear increase in the temperature to approximately 900° C. has taken place first of all during the first 10 hours. Subsequently, an increase to 1000° C. took place during the course of approximately 2 hours and from 1000° C. a linear increase in the temperature to 1650° C. up to approximately 22 hours.

The cooling from 1650° C. to approximately 1000° C. then took place up to approximately 25 hours and from 1000° C. a linear cooling to room temperature took place up to approximately 37 hours.

Figure 10:
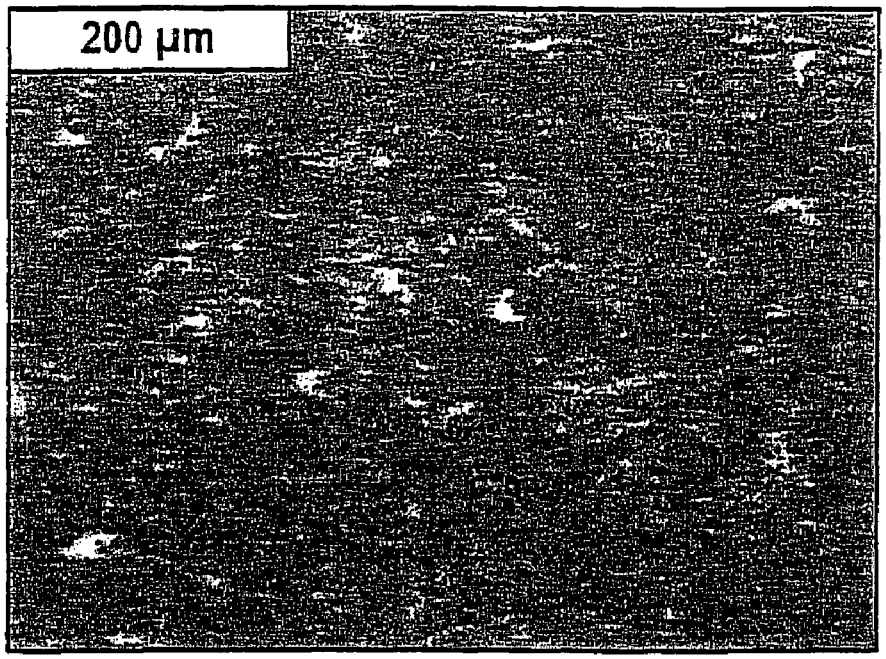
FIG. 10 shows a structural image of a ground surface in the case of SiC ceramics in accordance with the first embodiment of the inventive method.
Figure 11:
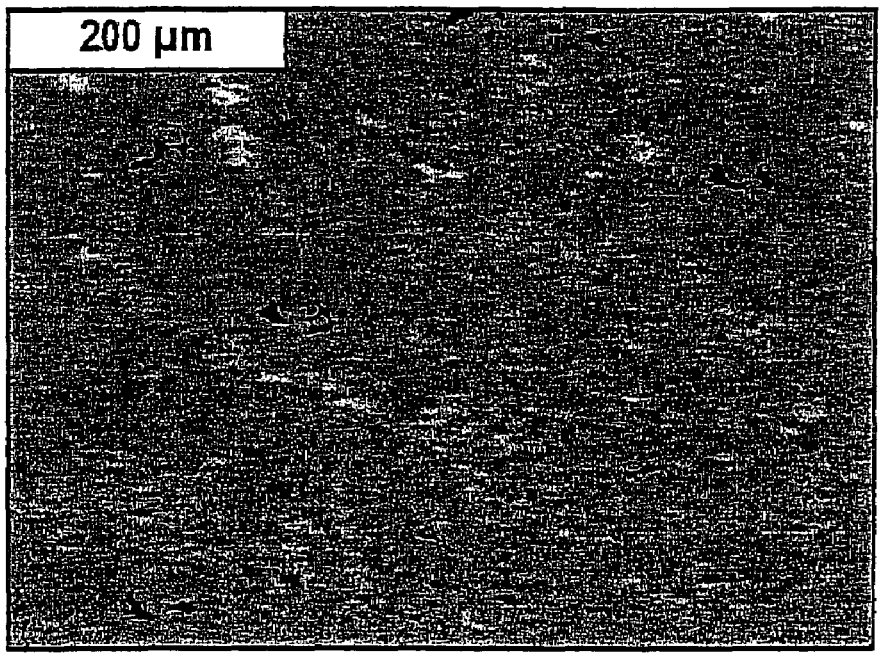
FIG. 11 shows a structural image of a cross-ground surface of the SiC ceramics in accordance with the first embodiment of the inventive method.

The resulting structural ceramics and/or functional ceramics have, as shown by the structural images in FIG. 10 and FIG. 11, more or less no pores. This also results from Table 1 (shown below), in which a porosity of approximately 0.08% by volume and a density of approximately 3.07 g/cm$^3$ are given for the structural ceramics and/or functional ceramics.

TABLE 1

Porosity and Density of the Sample from Example 1 during the different Process Stages

|  | Precursor Body | After 1st Pyr. Stage | After 2nd Pyr. Stage | SiC Ceramics |
|---|---|---|---|---|
| Porosity [% vol.] | 38 | 52 | 56 | 0.08 |
| Density [g/cm³] | 0.90 | 0.87 | 0.85 | 3.07 |

The average bending strength of the structural or functional ceramics is approximately 400 MPa, at a hardness of HR 83, which has been determined in accordance with the Rockwell method.

In FIGS. 10 and 11, structural images of the ceramics are shown. Determined wet chemically, the SiC proportion is at approximately 82.7% by volume, the C proportion at approximately 0.18% and the Si proportion at approximately 17.12% with an open residual porosity of approximately 0.1%.

Figure 12:
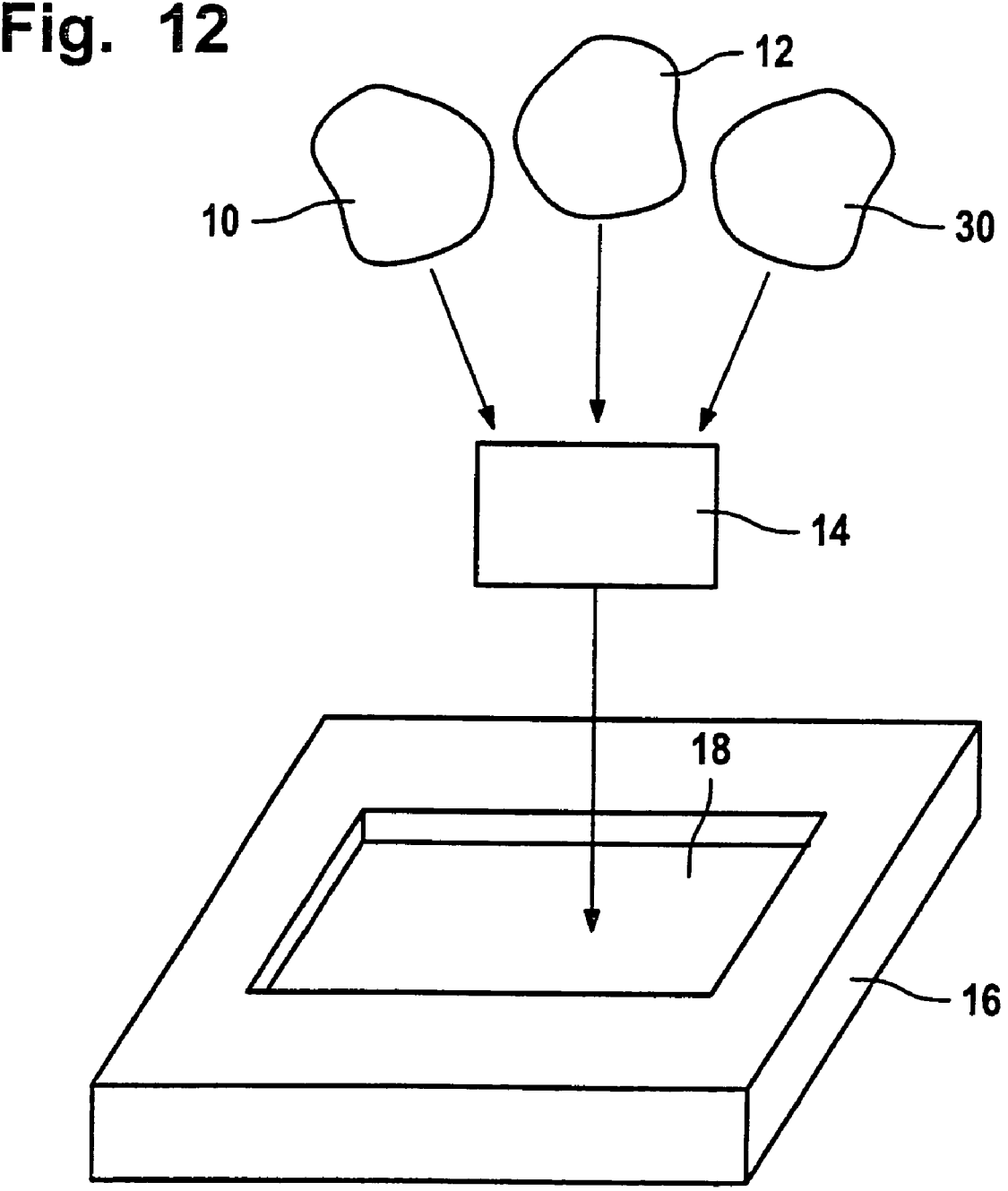
FIG. 12 shows a schematic illustration of the first method steps similar to FIG. 1 in a second embodiment of the inventive method and FIG. 13 shows a schematic illustration of a temperature control in the case of a one-step pyrolysis in accordance with a third embodiment of the inventive method.

In a second embodiment of an inventive method, illustrated schematically in FIG. 12, not only wood flour 10, for example, beech flour and binding agent 12 are mixed in a dry state in the mixer 14 as starting ingredients but also carbon black 30 as additive, wherein the proportion of the wood flour 10 is, for example, approximately 54.5% by mass, the proportion of the binding agent approximately 13.5% by mass and the proportion of the additive 30, for example, in the form of carbon black 32% by mass. This mixture is pressed in the mold 16—in the same way as in the first embodiment—at approximately 15 bar and, subsequently, the molded body 20 is heated up for the formation of the precursor body 22, with hardening of the binding agent 12, to a temperature of approximately 220° C.

Without additional preliminary drying, the precursor body 22 thereby resulting is pyrolysed immediately following the hardening of the binding agent.

The porosity and density of the precursor body prior to the pyrolysis, after the first pyrolysis stage and after the second pyrolysis stage are illustrated in Table 2 (shown below).

TABLE 2

Porosity and Density of the Sample from Example 2 during the different Process Stages

|  | Precursor Body | After 1st Pyr. Stage | After 2nd Pyr. Stage | SiC Ceramics |
|---|---|---|---|---|
| Porosity [% vol.] | 40 | 62 | 56 | 0.4 |
| Density [g/cm³] | 0.88 | 0.69 | 0.66 | 2.94 |

Due to the use of the additive 30 in the form of carbon black, the loss in mass during the pyrolysis amounted to only approximately 45% after the second pyrolysis stage and the linear change in dimensions was approximately 10%.

On account of the reduced loss in mass and the reduced shrinkage in volume as a result of the additive, any deformation of the plate during the pyrolysis could be avoided.

As for the rest, the pyrolysis took place in the same way as that described in conjunction with the first embodiment.

$$\begin{cases} \text{Sic} & 72.5\% \text{ by volume} \\ \text{Si} & 27.48\% \text{ by volume} \\ \text{C} & 0.02\% \text{ by volume} \\ \text{Open resid. porosity} & 0.4\% \text{ by volume} \end{cases} \begin{matrix} \text{total density of the SiC} \\ \text{material 2.94 g/cm}^3 \end{matrix}$$

In a third embodiment of an inventive method, the precursor body 22 is produced in the same way as that described in conjunction with the second embodiment and illustrated schematically in FIG. 12.

Figure 13:
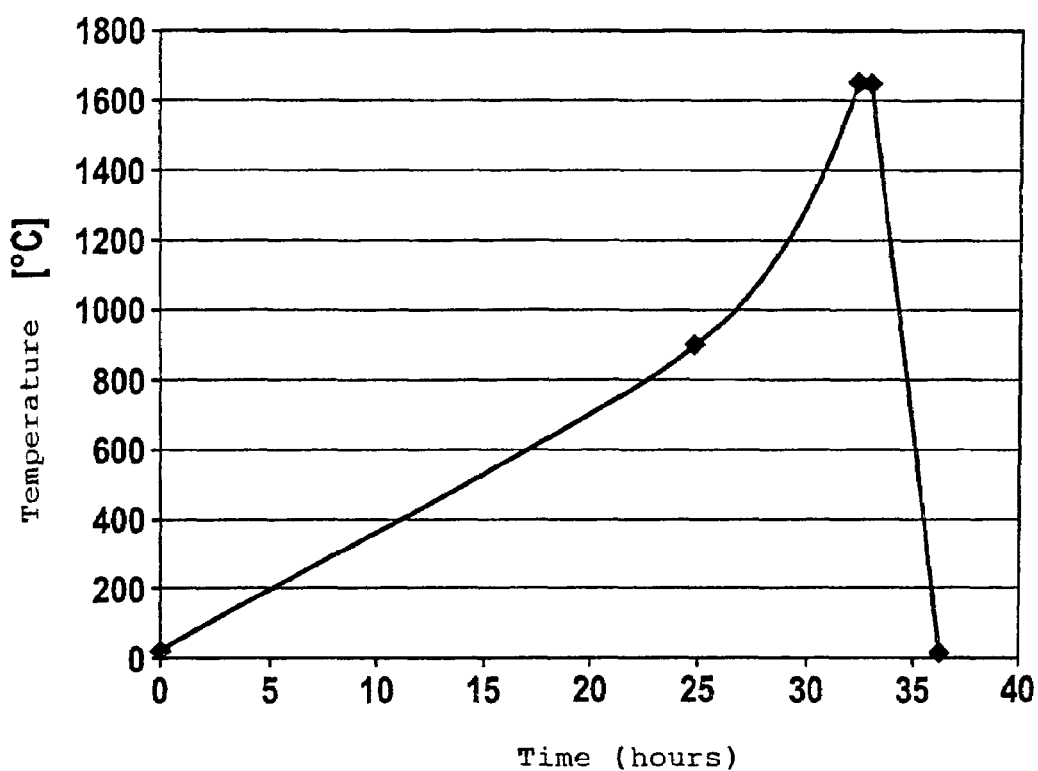

In modification of the second embodiment, the pyrolysis is, however, carried out in the form of a one-stage pyrolysis, wherein the temperature control of the one-stage pyrolysis is illustrated in FIG. 13. Furthermore, the pressure of the nitrogen was less than 200 mbar until a temperature of approximately 900° C. was reached and above a temperature of 900° C. the pressure of the nitrogen was reduced to less than 2 mbar for such a time until a temperature of 1650° C. was reached. The temperature of approximately 1650° C. was reached after approximately 32 hours and, subsequently, a cooling to room temperature took place up to approximately 35 hours.

When using the precursor body 22, a loss in mass of approximately 49% occurred in the case of the one-stage pyrolysis and high heating rates of approximately 35 degrees per hour. The change in length and thickness of the precursor body 22 was approximately a respective 11%. As a result of the isotropic shrinkage of the precursor body 22 during the pyrolysis, the precursor body 22 could also be pyrolysed free from cracks without any mechanical pressure load.

The open porosities and densities resulting in this one-stage pyrolysis process, which was carried out without any mechanical weighting are likewise illustrated in Table 3 (shown below) in a summarized manner. The following phase proportions were determined wet chemically:

| SiC | 66.82% by volume |
|---|---|
| Si | 33.15% by volume |
| C | 0.03% by volume |

TABLE 3

Porosity and Density of the Sample from Example 3 during the different Process Stages

|  | Precursor Body | After Pyrolysis | SiC Ceramics |
|---|---|---|---|
| Porosity [% vol.] | 40 | 56 | 0.2 |
| Density [g/cm³] | 0.88 | 0.66 | 2.92 |

In a fourth embodiment, the first embodiment is modified insofar as no binding agent is used but rather the wood flour 10 is bonded to form the precursor body merely by pressing.

As for the rest, the fourth embodiment corresponds to the first embodiment.

In a fifth embodiment, cellulose powder is used instead of wood flour 10 in modification of the fourth embodiment and likewise bonded only by pressing so that an adequately stable precursor body results.

The invention claimed is:

1. Method for the production of structural ceramics and/or functional ceramics at least partially consisting of silicon-containing carbide ceramics, comprising:

producing a porous precursor body from at least a cellulose-containing powder and at least one additive as starting ingredients, said at least one additive comprising carbon powder, converting the porous precursor body into an open-pored carbon body by means of pyrolysis, and converting at least a portion of the open-pored carbon body into silicon-containing carbide ceramics as a result of at least partial infiltration of silicon-containing materials into said open-pored carbon body.

2. Method as defined in claim 1, wherein the starting ingredients have a grain size of less than 100 μm.

3. Method as defined in claim 1, wherein the starting ingredients have a grain size of less than 50 μm.

4. Method as defined in claim 1, wherein the cellulose-containing powder has particles free from any capillary cell structure.

5. Method as defined in claim 1 wherein the cellulose-containing powder has a grain size of less than 50 μm.

6. Method as defined in claim 1, wherein the cellulose-containing powder has a grain size of less than 30 μm.

7. Method as defined in claim 1, wherein the cellulose-containing powder comprises wood powder.

8. Method as defined in claim 1, wherein the cellulose-containing powder is free from-cellular structures.

9. Method as defined in claim 1, wherein the cellulose-containing powder comprises cellulose powder.

10. Method as defined in claim 1, wherein said at least one additive comprises a reactive additive.

11. Method as defined in claim 1, wherein said at least one additive comprises a non-reactive additive.

12. Method as defined in claim 1, wherein the pyrolysing of the precursor body is carried out at a pressure of less than 1,000 mbar.

13. Method as defined in claim 1, wherein the pyrolysing of the precursor body is carried out in one stage.

14. Method as defined in claim 13, wherein a heating up from room temperature to at most approximately 1700° C. is brought about during the one-stage pyrolysing.

15. Method as defined in claim 13, wherein the one-stage pyrolysing is carried out during a total time period of not more than 120 hours.

16. Method as defined in claim 1, wherein the pyrolysing of the precursor body is carried out in at least two stages.

17. Method as defined in claim 16, wherein a heating up from room temperature to at most approximately 900° C. is brought about in a first pyrolysing stage.

18. Method as defined in claim 17, wherein a cooling to room temperature is brought about after the first pyrolysing stage.

19. Method as defined in claim 17, wherein the pyrolysing is carried out in a first pyrolysing stage during a total time period of not more than 120 hours.

20. Method as defined in claim 16, wherein in a second pyrolysing stage the pyrolysing comprises a temperature treatment from room temperature up to at the most 1700° C.

21. Method as defined in claim 16, wherein in the second pyrolysing stage the pyrolysing is carried out at a pressure of between approximately 0.1 mbar and approximately 10 mbar.

22. Method as defined in claim 16, wherein after the second pyrolysing stage a cooling to room temperature is brought about.

23. Method as defined in claim 1, wherein the open-pored carbon body obtained as a result of the pyrolysis has a porosity in a range of between approximately 30% by volume and approximately 80% by volume.

24. Method as defined in claim 23, wherein the open-pored carbon body obtained as a result of the pyrolysis has a porosity in a range of between approximately 35% by volume and approximately 70% by volume.

25. Method as defined in claim 1, wherein the carbon body obtained as a result of the pyrolysis has an essentially isotropic porosity.

26. Method as defined in claim 1, wherein the carbon body obtained as a result of the pyrolysis has infiltration properties for silicon-containing materials essentially independent of direction.

27. Method as defined in claim 1, wherein the carbon body obtained as a result of the pyrolysis is produced in a shape close to a shape of a component being produced.

28. Method as defined in claim 1, wherein the carbon body obtained as a result of the pyrolysis is produced as a portion of a shape of a component being produced.

29. Method as defined in claim 1, wherein the converting of the at least a portion of the open-pored carbon body into said silicon-containing carbide ceramics is carried out in the form of a liquid siliconization.

30. Method as defined in claim 29, wherein the temperature during the siliconization is above 1400° C.

31. Method as defined in claim 29, wherein a maximum temperature during the siliconization is maintained for up to two hours.

32. Method as defined in claim 29, wherein during the siliconization at least approximately 200% of silicon in relation to the mass of the carbon body is provided.

33. Method as defined in claim 29, wherein during the siliconization a silicon granulate is provided having a grain size between approximately 0.1 mm and approximately 10 mm.

34. Method as defined in claim 1, wherein the open-pored carbon body is converted into silicon-containing carbide ceramics with an essentially isotropic silicon carbide ceramic structure throughout.

35. Method for the production of structural ceramics and/or functional ceramics at least partially consisting of silicon-containing carbide ceramics, comprising:

producing a porous precursor body from at least a cellulose-containing powder and at least one additive as starting ingredients, said at least one additive comprising at least one of carbides, borides, nitrides, silicides, and oxides as non-reactive additives, converting the porous precursor body into an open-pored carbon body by means of pyrolysis, and converting at least a portion of the open-pored carbon body into silicon-containing carbide ceramics as a result of at least partial infiltration of silicon-containing materials into said open-pored carbon body.

36. Method as defined in claim 35, wherein the additive is in powder form.

37. Method as defined in claim 36, wherein the additive has a grain size in the order of magnitude of or less than the grain size of the cellulose-containing powder.

38. Method as defined in claim 37, wherein the grain size of the at least one additive and of the cellulose-containing powder differ at the most by a factor of 5.

39. Method as defined in claim 35, wherein the starting ingredients are mixed in a dry state.

40. Method as defined in claim 39, wherein the starting ingredients are homogenized as a result of mixing.

41. Method as defined in claim 35, wherein the starting ingredients are fed into a mold.

42. Method as defined in claim 41, wherein the starting ingredients are fed into the mold in a dry state.

43. Method as defined in claim 35, wherein the starting ingredients are pressed to form a molded body.

44. Method as defined in claim 43, wherein the starting ingredients are compressed to form the molded body at compacting pressures of up to 15 MPa.

45. Method as defined in claim 43, wherein the starting ingredients are pressed to form the molded body essentially without any heating.

46. Method as defined in claim 43, wherein the pressing is carried out such that the molded body has a density in the range of approximately 0.4 g/cm$^3$ to approximately 1.5 g/cm$^3$.

47. Method as defined in claim 46, wherein the pressing is carried out such that the molded body has a density in the range of approximately 0.65 g/cm$^3$ to approximately 1.0 g/cm$^3$.

48. Method as defined in claim 35, wherein the porous precursor body has an average porosity in a range of between approximately 10% by volume and approximately 70% by volume.

49. Method as defined in claim 48, wherein the porous precursor body has an average porosity in a range of between approximately 20% by volume and approximately 60% by volume.

50. Method for the production of structural ceramics and/or functional ceramics at least partially consisting of silicon-containing carbide ceramics, comprising:
producing a porous precursor body from at least a cellulose-containing powder and a binding agent as starting ingredients, the starting ingredients having a grain size of less than 100 μm,
converting the porous precursor body into an open-pored carbon body by means of pyrolysis, and
converting at least a portion of the open-pored carbon body into silicon-containing carbide ceramics as a result of at least partial infiltration of silicon-containing materials into said open-pored carbon body,
wherein after hardening of the binding agent the precursor body is stored in a manner inert to moisture.

51. Method as defined in claim 50, wherein said binding agent comprises a dry binding agent.

52. Method as defined in claim 51, wherein the dry binding agent is added to the cellulose-containing powder in powder form.

53. Method as defined in claim 52, wherein the dry binding agent powder has a grain size of less than 100 μm.

54. Method as defined in claim 50, wherein the binding agent comprises a phenol resin.

55. Method as defined in claim 50, wherein a grain size of the cellulose-containing powder and of the binding agent are approximately of a same order of magnitude.

56. Method as defined in claim 55, wherein the grain size of the cellulose-containing powder and of the binding agent differ from one another by at the most a factor of 3.

57. Method as defined in claim 55, wherein the grain size of the cellulose-containing powder and of the binding agent do not essentially differ.

58. Method as defined in claim 50, wherein the starting ingredients are compressed to form the molded body without any hardening of the binding agent.

59. Method as defined in claim 50, wherein the molded body is heated to a temperature causing the binding agent to harden.

60. Method as defined in claim 59, wherein the molded body is heated up in such a manner that the binding agent is hardened essentially completely.

61. Method as defined in claim 59, wherein the hardening of the binding agent takes place at temperatures of up to 220° C.

62. Method as defined in claim 59, wherein the heating of the molded body takes place in a press.

63. Method as defined in claim 50, wherein said precursor body is pyrolysed essentially without any storage time following hardening of the binding agent.

64. Method as defined in claim 50, wherein after the hardening of the binding agent the precursor body is stored in a manner closed so as to be air-tight.

65. Method as defined in claim 64, wherein the precursor body is sealed in a film.

66. Method as defined in claim 50, wherein after the hardening of the binding agent the precursor body is stored in inert gas.

67. Method as defined in claim 50, wherein the porous precursor body is dried prior to the pyrolysing.

68. Method as defined in claim 67, wherein the drying is carried out in several temperature stages.

69. Method as defined in claim 68, wherein a drying temperature in a first drying stage is between room temperature and at most approximately 35° C.

70. Method as defined in claim 68, wherein the drying temperature in a second drying stage is in the range of between approximately 35° C. and at most approximately 70° C.

71. Method as defined in claim 68, wherein the drying temperature in a third drying stage is between approximately 70° C. and at most approximately 110° C.

72. Method as defined in claim 67, wherein a heating velocity during the drying is at the most 10 degrees/min.

73. Method as defined in claim 67, wherein a holding time in a drying stage is at most approximately 20 hours.

74. Method as defined in claim 50, wherein the pyrolysing of the precursor body is carried out in a nitrogen atmosphere.

75. Method as defined in claim 74, wherein the pyrolysing is carried out at a nitrogen atmosphere pressure of at least 1,000 mbar.

76. Method for the production of structural ceramics and/or functional ceramics at least partially consisting of silicon-containing carbide ceramics, comprising:
producing a porous precursor body from at least a cellulose-containing powder as a starting ingredient,
converting the porous precursor body into an open-pored carbon body by means of pyrolysis, and
converting at least a portion of the open-pored carbon body into silicon-containing carbide ceramics by siliconization as a result of at least partial infiltration of silicon-containing materials into said open-pored carbon body,
the siliconization being carried out in a nitrogen atmosphere having a pressure in the range of between approximately 0.1 mbar and approximately 10 mbar.

* * * * *